United States Patent [19]

Harrison

[11] Patent Number: 5,450,374
[45] Date of Patent: Sep. 12, 1995

[54] AIR SAVING SLEEVE GUN

[75] Inventor: Earnest R. Harrison, Plano, Tex.

[73] Assignee: Western Atlas International Inc., Houston, Tex.

[21] Appl. No.: 146,608

[22] Filed: Nov. 2, 1993

[51] Int. Cl.6 .......................... G01V 1/40; H04R 23/00
[52] U.S. Cl. ...................................... 367/144; 181/120
[58] Field of Search ......................... 367/144; 181/120

[56] References Cited

U.S. PATENT DOCUMENTS

| | | |
|---|---|---|
| 4,034,827 | 7/1977 | Leerskov, Jr. et al. |
| 4,047,591 | 9/1977 | Ward et al. |
| 4,219,097 | 8/1980 | Harrison et al. |
| 4,225,009 | 9/1980 | Harrison et al. |
| 4,230,201 | 10/1980 | Bays. |
| 4,623,033 | 11/1986 | Harrison, Jr. |
| 5,001,679 | 3/1991 | Harrison, Jr. |
| 5,144,596 | 9/1992 | Pascouet ........................... 367/144 |
| 5,228,010 | 7/1993 | Harrison. |
| 5,263,007 | 11/1993 | Jenkins .............................. 367/144 |
| 5,315,917 | 5/1994 | Mayzes ............................. 367/144 |

OTHER PUBLICATIONS

Technical paper written by Roy C. Johnston, "Development of More Efficient Air Gun Arrays: Theory and Experiment, " was delivered at the 1981 European Association of Exploration Geophysicists conference, Venice, Italy.

"Airgun Efficiency–Some Measurements," lecture presented by Mr. Lloyd Paitson of Exploration Equipment Research, Inc. to the E.A.E.G. conference, Hamburg, May 29, 1979.

Brochure "EERI Model 3 Air Gun," EERI Exploration Equipment Research, Inc., Galveston, Tex. 77552.

Primary Examiner—J. Woodrow Eldred
Attorney, Agent, or Firm—Arnold, White & Durkee

[57] ABSTRACT

A seismic source apparatus 10 includes body 12, cap 22, actuator 24, and shuttle 26. Body 12 includes a main chamber 14 that is formed therein and adapted to receive a charge of compressed air. Actuator 24 is preferably a solenoid actuated valve, capable of rapidly opening and closing in response to an electrical signal. Seismic source apparatus 10 includes a solenoid chamber orifice 38 that is positioned within a fill passage 34 to enable fluid communication between fill passage 34 and solenoid chamber 40. Solenoid chamber orifice 38 and solenoid chamber 40 are configured to provide a quick burst of high pressure air through actuator 24 when actuator 24 is opened in order to start the shuttle 26 in motion, while restricting the flow of air from main fill passage 34 and main chamber 14 into the actuator 24 so that the pressure in the main chamber 14 remains high enough to emit a suitable bubble, and so that shuttle 26 is not prevented from closing. A spring chamber 44 containing either compressed air or a mechanical spring provides a closing force bearing on surface 46 of shuttle 26. A shut-off chamber 68 is circumferentially disposed between shuttle 26 and cap 22, and is adapted to receive a portion of air released from the main chamber 14 during firing to provide an additional closing force on shuttle 26 when seismic source apparatus 10 is fired. A water sealing mechanism 74 prevents the flow of ambient fluid into shut-off chamber 68 prior to firing.

16 Claims, 3 Drawing Sheets

AIR SAVING SLEEVE GUN

BACKGROUND OF THE INVENTION

1. Field of the Invention

This invention relates to seismic source devices and more particularly to a shuttle controlled seismic source device which allows only a portion of the compressed air in the main chamber of the device to be discharged into the surrounding environment.

2. Description of the Prior Art

In marine seismic exploration, a source of acoustic energy is released into the water every few seconds to obtain appropriate acoustic waves that propagate into the earth's surface. These waves are reflected at interfaces of the subsurface formations and propagate back to instruments where transducers convert the acoustic waves to electronic signals which are recorded and later processed into a record section for interpretation of the subsurface formations.

In recent times, the major marine seismic energy source has been the air gun. These air guns release high pressure air, typically 2,000 psig to 6,000 psig into the water to create the desired acoustic wave.

Many conventional air guns comprise an annular housing that contains means for discharging compressed air through exhaust ports in the housing. Compressed air is stored within the housing in a main chamber. The only moving component (except for the solenoid triggering device) is a shuttle, which when raised, permits air to escape from the main chamber through the ports in the main housing into the surrounding water. The size of the gun is determined by the main chamber volume selected. By having a constant source of compressed air through an inlet passage in the housing, the upper chamber containing the shuttle is filled and forces the shuttle into a sealed position, closing off all exhaust ports from the main chamber. By using a solenoid valve to allow air flow beneath the shuttle face and cause an unequal pressure on the shuttle, the shuttle is accelerated in the upward direction, exposing the chamber exhaust ports and allowing compressed air to escape into the surrounding water. When the shuttle is in the "down," or pre-fire position, the air gun is charged and ready for firing.

Air guns are typically deployed underwater in an array. When fired, the air guns nearly simultaneously release compressed air with a velocity at or near Mach 1. The discharging air from each gun forms a substantially spherical bubble having an air/water interface that translates radially outward from the gun at some initial acceleration. The rapid expansion of the air/water interface causes the desired compression wave. The point in time when the acceleration of the air/water interface declines to approximately zero corresponds to the maximum acoustic pressure generated by each individual gun.

At some instant in time after the maximum acoustic pressure is reached, the bubble generated by each gun begins to collapse under the pressure of the surrounding water. The collapsing bubble does not collapse instantaneously, but rather tends to collapse and reexpand cyclically with a frequency of oscillation that is peculiar to the particular gun. The oscillatory collapse of the bubble generates a series of secondary acoustic pulses, which, if not filtered, obscure the behavior of the acoustic waves from the first bubbles.

The sizes of the individual guns are tailored to the sizes of the other guns in the array so that the amplitudes of the initial pulses from each gun constructively interfere or add, while the undesirable secondary acoustic pulses from the oscillatory collapse of the bubbles destructively interfere.

Experimentation has shown that it is more difficult to tailor the array of air guns to use destructive interference to successfully nullify secondary acoustic pulses from relatively larger (as opposed to smaller) bubbles from the air guns. Thus, it is desirable to have the air guns produce as small bubbles as possible.

When fired, the typical air gun allows 80% to 90% of the air in the main chamber to be exhausted into the water. However, as noted above, during the firing sequence of this type of air gun, the acoustic pressure generated by the air discharging from the main chamber will rapidly increase to a maximum and then begin to tail off, shortly after the air begins to discharge from the main chamber and well before the main chamber is completely discharged. Thus, any air discharged from the main chamber after the maximum acoustic pressure is reached is wasted, and will form another bubble that will create an undesired pulse.

Large losses of air mass from the main chamber result in two undesirable effects: (1) the requirement for unnecessarily large shipboard compressor equipment; and (2) the production of large bubbles that may produce secondary pulses that prove difficult to filter. Large losses of air volume from the main chamber require more time and more air, and thus larger shipboard compressor equipment, to recharge the air gun between firing cycles.

The prior art contains a number of devices designed to control the amount of compressed air lost during firing. These previous designs have utilized a dual shuttle arrangement wherein the first shuttle is configured to enable compressed air to escape into the surrounding water, and the second shuttle is configured to close the opening through which the compressed air is discharged to minimize the amount of compressed air lost during each firing cycle. In these devices, typically the second shuttle is activated by the air discharge flow resulting from the action of the first shuttle. The action of the discharging air flowing around the second shuttle causes it to close.

Due to the unavoidable variations in the air flow around the second shuttle as a result of surface imperfections on the second shuttle, irregular kinetic friction between the second shuttle and the housing, and the non-linear behavior of air flowing at very high Reynolds numbers, the closing time for the second shuttle may vary greatly from one firing cycle to the next. The result is wide variation in the air bubble size that is discharged from the gun and the resulting period of oscillation. Filtering out such variations by use of destructive interference or other methods has proven difficult.

The present invention is directed to overcoming or minimizing one or more of the problems discussed above.

SUMMARY OF THE INVENTION

A seismic source apparatus having a selectively energizable actuator and a supply of compressed air includes a housing adapted to receive a charge of compressed air from the supply of compressed air. A shuttle is movably retained relative to the housing, and movable between a first, pre-firing position, and a second, firing position. The shuttle and the housing cooperatively define a firing aperture when the shuttle is moved away from the first position. A shut-off chamber is formed between surfaces associated with thee housing and the shuttle. The shut-off chamber is operable to receive a charge of compressed air from the housing to urge the shuttle to return to its first position after movement to the second position. A shut-off passage provides fluid communication between the shut-off chamber and the firing aperture when the shuttle is moved away from the first position. A water sealing mechanism is movably retained relative to the housing and is adapted to prevent ambient liquid from flowing into the shut-off passage when the shuttle is in its first position.

In another preferred embodiment, a seismic source apparatus having a selectively energizable actuator and a supply of compressed air includes a housing assembly adapted to receive a charge of compressed air from the supply of compressed air. The housing at least partially defines a main chamber. A shuttle, having a pre-firing position, is slidably mounted around the periphery of the housing and is operable to selectively allow the escape of compressed air from the housing when the seismic source apparatus is fired. A shut-off chamber is formed between the surfaces of the housing and the shuttle. The shut-off chamber is operable to receive a charge of compressed air from the main chamber to urge the shuttle to return to its pre-firing position when the seismic source apparatus is fired. A shut-off passage couples the shut-off chamber with the housing to enable the charge of compressed air to flow into the shut-off chamber when the seismic source apparatus is fired. A solenoid chamber is coupled to the housing. The solenoid chamber is adapted to receive compressed air from the supply of compressed air, and is selectively operable to supply the compressed air into the actuator when the seismic source apparatus is fired to urge the shuttle to leave its pre-firing position. A water sealing mechanism is movably retained relative to the housing and is adapted to prevent ambient liquid from flowing into the shut-off passage when the shuttle is in the pre-firing position.

BRIEF DESCRIPTION OF THE DRAWINGS

Other advantages of the invention will become apparent upon reading the following detailed description and references to the drawings in which.

DESCRIPTION OF THE PREFERRED EMBODIMENT

Figure 1:
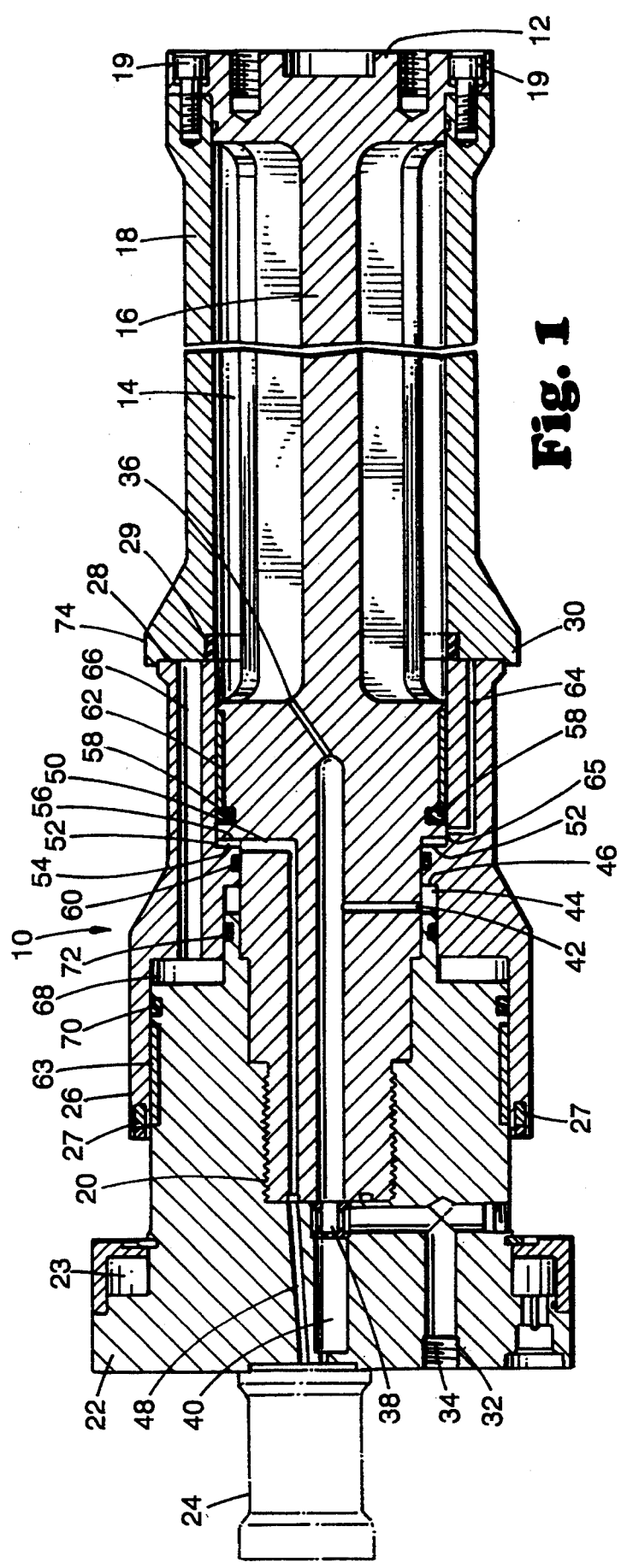
FIG. 1 depicts the seismic source apparatus during the pre-firing sequence, illustrated partially in vertical section.

Referring to FIG. 1, therein is depicted an exemplary preferred embodiment of a seismic source apparatus 10 in its pre-firing configuration, seismic source apparatus 10 includes a body assembly or housing 12, cap 22, actuator 24, and shuttle 26. Body 12 and chamber sleeve 18 cooperatively form a main chamber 14 that is around center post 16. The size and specific configuration of main chamber 14 will depend on the magnitude of acoustic waves required for the particular survey. Chamber sleeve 18 encloses main chamber 14. Chamber sleeve 18 is coupled to body 12 by way of bolts 19.

The cap 22 and body 12 are preferably threadably coupled by the threaded connection between cap 22 and a threaded portion 20 of body 12. Other connection methods may alternatively be used such as welding. Cap 22 includes a timing coil 23 adapted to send a signal to a sensing unit (not shown). Sensing unit (not shown) monitors when seismic source apparatus 10 fires. Monitoring is necessary to assure the synchronization of the firing of all of the air guns in a typical array. The operation of timing coil 23 is discussed more fully below.

Actuator 24 is coupled to cap 22. Actuator 24 is preferably a conventional solenoid actuated valve, capable of rapidly opening and closing in response to an electrical signal and capable of withstanding pneumatic pressures as great as 6000 psig or higher. A preferred type of actuator is the Model SV-3, manufactured by Halliburton Energy Services Company.

Shuttle 26 slidably encircles portions of body 12 and cap 22. At one end of shuttle 26, a plurality of permanent magnets 27 are circumferentially disposed. Magnets 27 are configured and placed to energize timing coil 23 when magnets 27 contact cap 22 proximate timing coil 23, as when shuttle 26 translates toward actuator 24 during firing. At the other end of shuttle 26 a shuttle face 28 abuts chamber sleeve 18. A face seal 29 extends around the internal periphery of one end of chamber sleeve 18 and abuts shuttle face 28. Face seal 29 is configured to prevent the flow of compressed air from main chamber 14 past shuttle face 28 when shuttle 26 is in its pre-firing position, as shown in FIG. 1. A chamber sleeve lip 30 extends around the external periphery of a portion of shuttle 26 adjacent to shuttle face 28.

As discussed more fully below, when seismic source apparatus 10 is fired, shuttle 26 translates toward cap 22, and compressed air from main chamber 14 flows past face seal 29, shuttle face 28, and chamber sleeve lip 30, and emanates radially outwardly from body 12 in a 360° pattern, forming a substantially spherical bubble that generates an acoustic pressure wave.

A fill port 32 extends into a fill passage 34 which extends through cap 22 and threaded portion 20 of body 12, terminating within center post 16. A fill orifice 36 extends from fill passage 34 to main chamber 14 to enable compressed air to be introduced into fill passage 34 from fill port 32 to pass into main chamber 14. Fill passage 34 is configured to carry a supply of high pressure compressed air, and is connected to a continuously pressurized source of compressed air (not shown).

Figure 2:
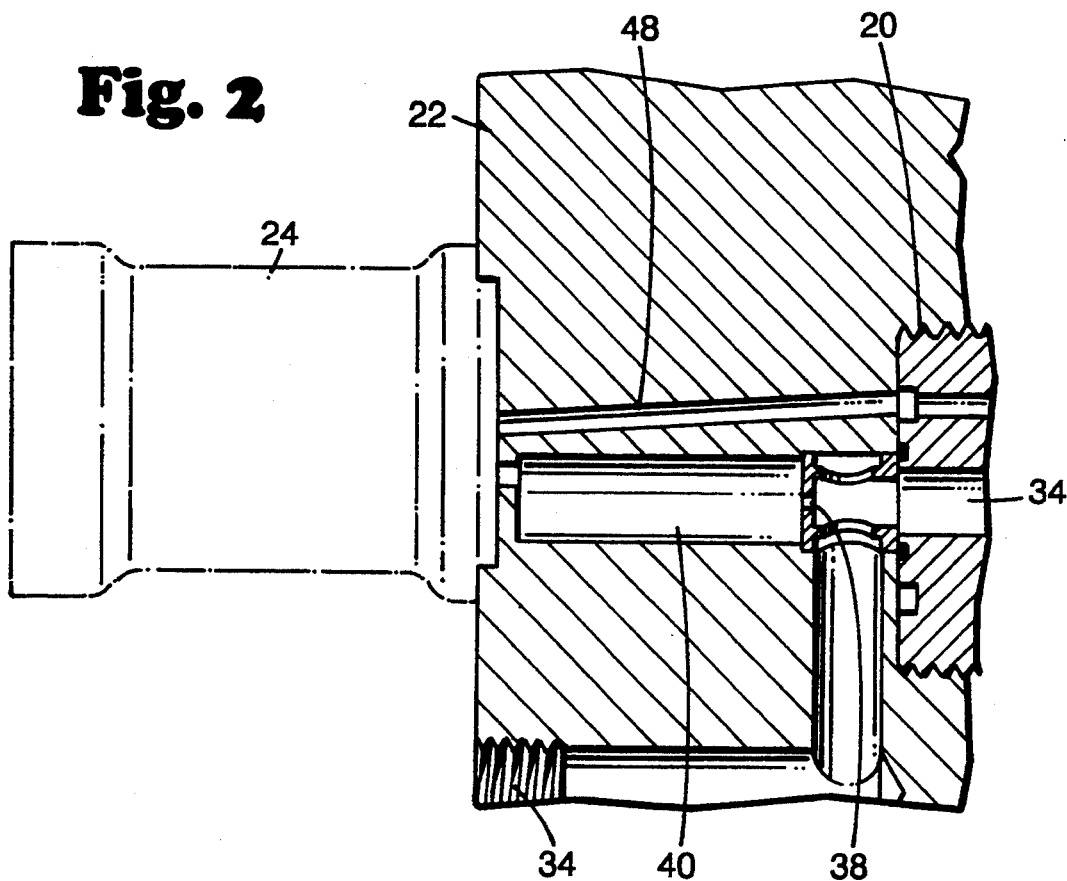
FIG. 2 depicts a close up detail of one portion of the seismic source apparatus, showing the solenoid chamber and the solenoid chamber orifice, illustrated partially in vertical section.

Referring now also to FIG.2, in a preferred embodiment, seismic source apparatus includes a solenoid chamber orifice 38 that is positioned within fill passage 34 and enables fluid communication between fill passage 34 and solenoid chamber 40. As discussed more fully below, solenoid chamber orifice 38 and solenoid chamber 40 are configured to provide a quick burst of high pressure air through actuator 24 when actuator 24 is opened in order to start the shuttle 26 in motion, while restricting the flow of air from fill passage 34 into the actuator 24 so that the pressure in the main chamber 14 remains high enough to emit a suitable bubble, and so that a limited air volume flows from the continuously pressurized compressed air source (not shown) into firing passage 48 while actuator 24 hangs open.

A secondary passage 42 extends from fill passage 34 to a circumferential spring chamber 44. Compressed air flows from fill passage 34 into spring chamber 44 to provide a force bearing on surface 46 of shuttle 26. The diameter of secondary passage 42 is preferably larger than the diameter of fill orifice 36 to enable spring chamber 44 to pressurize before main chamber 14 pressurizes so that there will be a minimal net opening force exerted on shuttle 26 prior to spring chamber 44 reaching full pressurization.

A mechanical spring (not shown) may alternatively be inserted into spring chamber 44 to provide a force bearing on surface 46 of shuttle 26. The spring (not shown) may act alone in providing a force against shuttle 26 thus obviating the need for secondary passage 42. Alternatively, the spring (not shown) may act in concert with compressed air that is introduced into spring chamber 44 to provide a force against shuttle 26.

In another preferred embodiment, the secondary passage 42 may be eliminated and the spring chamber 44 filled with a fixed quantity of inert gas, via a supply port (not shown). In such an embodiment, the spring chamber 44 would behave like a sealed gas spring.

Both the mechanical spring (not shown) and the sealed gas spring (not shown) have the advantage of providing a constant closing force on the shuttle 26, independent of the pressurization of the seismic source apparatus 10. A seismic source apparatus 10 having either of these types of springs may be deployed underwater without having to be pressurized on board ship.

The specific configuration of spring chamber 44 is not critical as long as a sufficient area of shuttle 26 encloses spring chamber 44 such that the force imparted by the compressed air or spring (not shown) in the spring chamber 44 on shuttle 26 is sufficient to hold shuttle 26 in its pre-firing position during pressurization, and is sufficient to assist in the translation of shuttle 26 toward chamber sleeve 18 during the firing sequence.

A firing passage 48 extends from actuator 24 through cap 22 and the threaded portion 20 of body 12, terminating within body 12. A firing chamber passage 50 extends from firing passage 48 to a firing chamber 52. Firing chamber 52 is formed by the surface 54 on shuttle 26 and the surface 56 on body 12. Seals 58 and 60 are circumferentially disposed between shuttle 26 and body 12 to prevent leakage of air from firing chamber 52. Wear rings 62 and 63 act as bearings for shuttle 26.

A boost passage 64 extends from one portion of shuttle face 28 to a point adjacent firing chamber 52 and between seals 58 and 60. While there are preferably four circumferentially spaced boost passages 64, only one is shown, and for the sake of simplicity, only one is discussed. At shoulder 65, there is sufficient clearance between shuttle 26 and body 12 to enable fluid communication between firing chamber 52 and boost passage 64. As a result of such fluid communication, boost passage 64 is pressurized as soon as actuator 24 opens. As discussed more fully below, when actuator 24 is opened, air flows from actuator 24 into firing chamber 52, and as a result of the above noted fluid communication, in turn, flows from firing chamber 52 into boost passage 64, providing an additional opening force on shuttle 26. When shuttle 26 begins to translate away from face seal 29, air from main chamber 14 will flow into boost passage 64 providing an added opening force on shuttle 26.

A shut-off passage 66 is shown extending from shuttle face 28 to a shut-off chamber 68 that is circumferentially disposed between shuttle 26 and cap 22. While there are preferably four circumferentially spaced shut-off passages 66, only one is shown, and for the sake of simplicity, only one is discussed. The exact configuration of shut-off chamber 68 is not critical as long as bearing surface 69 of shuttle 26 is sufficiently large such that compressed air flowing from main chamber 14 into shut-off chamber 68 will exert sufficient force on shuttle 26 to accelerate it toward chamber sleeve 18 after the firing sequence.

Seals 70 and 72 are circumferentially disposed between shuttle 26 and cap 22, and on either side of shut-off chamber 68 to prevent the leakage of air to or from shut-off chamber 68 and spring chamber 44.

Figure 3:
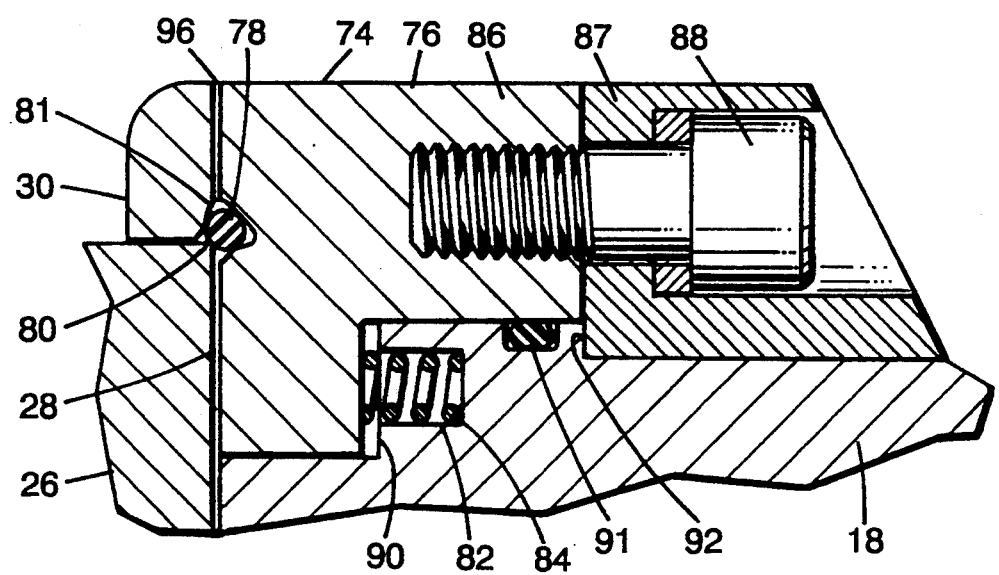
FIG. 3 depicts a close up detail of one portion of the seismic source apparatus, showing the water sealing mechanism, illustrated partially in vertical section.

Referring now also to FIG. 3 which shows a detailed view of the interface between shuttle face 28, face seal 29, and chamber sleeve lip 30, experiment has shown that if ambient water is allowed to flow past chamber sleeve lip 30 and enter shut-off chamber 68 when seismic source apparatus 10 is in its pre-firing position, seismic source apparatus 10 will fail to operate properly after a firing a few times. Accordingly, a water sealing mechanism 74 is positioned adjacent face seal 29 to prevent ambient water from flowing past chamber sleeve lip 30 and entering shut-off chamber 68 when seismic source apparatus 10 is submerged and in its pre-firing position. Water sealing mechanism 74 includes a sealing ring 76 that is slidably disposed around the periphery of chamber sleeve 18, an O-ring 78 disposed about the periphery of the shuttle outside diameter edge 80 and within peripheral channel 81, and a plurality of biasing members or peripheral springs 82 circumferentially disposed within chamber 84.

Sealing ring 76 is composed of a first ring 86 and a second ring 87 that are bolt connected by bolts 88. There are preferably eight bolts 88 spaced peripherally about sealing ring 76. Sealing ring 76 will have range of sliding motion toward and away from actuator 24 that is limited in one direction by stop 90, and in the other by stop 92. The range of sliding motion preferred for sealing ring 76 is normally quite small, and may be as small as 0.020 inches. It should be noted that chamber sleeve lip 30, as noted above, is actually preferably part of sealing ring 76.

O-ring 78 is disposed within dove-tailed channel 81 and provides the primary seal from ambient water pressure. A vent 96 extending from channel 81 to the exterior of sealing ring 76 vents pressure to prevent O-ring 78 from being pushed out of channel 81 when seismic source apparatus 10 is fired.

Peripheral springs 82, while shown and described as a plurality of coil springs for simplicity of illustration, may also comprise either a plurality of spring washers or wave springs. Peripheral springs 82 are configured to bias sealing ring 76 towards shuttle face 28 to compress O-ring 78 against shuttle outside diameter edge 80. Air pressure from shut-off chamber 68 and main chamber 14 is prevented from leaking around peripheral springs 82 and bolts 88 by O-ring 91.

The water sealing mechanism 74 is intended to operate as a relief valve which seals shuttle face 28 from ambient water while allowing internal air pressure to vent. If water sealing mechanism 74 fails to vent internal air pressure, such trapped pressure might prevent shuttle face 28 from seating against face seal 29.

The operation of the seismic source apparatus 10 may be divided into two operations, the pre-firing sequence, and the firing sequence. FIGS. 1–3 show the configuration of seismic source apparatus 10 during the pre-firing sequence. High pressure air, normally 2000 psig, or greater, is supplied to seismic source apparatus 10 through fill port 32. The compressed air passes through fill passage 34, solenoid chamber orifice 38, and through secondary passage 42 and fill orifice 36, pressurizing spring chamber 44, solenoid chamber 40, and main chamber 14. The air pressure and/or spring (not shown) in spring chamber 44 provides a force against shuttle 26 which moves shuttle 26 toward chamber sleeve 18, and compresses shuttle face against face seal 29, sealing main chamber 14. Typically, after a few seconds of flow through fill port 32, main chamber 14, spring chamber 44, and solenoid chamber 40 are pressurized to the full system pressure, and seismic source apparatus 10 is ready for the firing sequence. At this point, sealing ring 76 is biased against shuttle 28 face by peripheral springs 82, thereby sealing shut-off chamber 68 from the ambient water pressure surrounding seismic source apparatus 10.

At the outset of the firing sequence, actuator 24 is energized. A quick burst of air flows from solenoid chamber 40 through actuator 24, through firing passage 48 and firing chamber passage 50, and into firing chamber 52. The air pressure within firing chamber 52 provides a force bearing on surface 56 of shuttle 26 in the direction of actuator 24. While the pressure is approximately the same in both spring chamber 44 and firing chamber 52, the force acting on surface 54 of shuttle 26 is greater than the force exerted on shuttle 26 by the spring chamber 44 since the area of shuttle 26 exposed to firing chamber 52 is greater than the area of shuttle 26 that is exposed to spring chamber 44. In addition, air flows from firing chamber 52 through boost passage 66 and across shuttle face 28 to provide an additional opening force.

The following description of the operation and preferred dimensional ratios of the seismic source apparatus 10 is based to some extent on computer modelling.

As noted above, solenoid chamber 40 is configured to hold a small volume, high pressure, charge of air that is sufficient to start the shuttle 26 toward actuator 24. Solenoid chamber orifice 38 is configured to throttle air flowing from fill passage 34 and main chamber 14 into solenoid chamber 40. Since actuator 24 will have a tendency to hang open for approximately forty to fifty (40–50) milliseconds due to the residual magnetism in the actuator 24, while the shuttle 26 will typically open and close after approximately fourteen (14) milliseconds, any air flowing from fill passage 34 and main chamber 14 into actuator 24 after shuttle 26 closes will prevent shuttle 26 from closing. The purpose of solenoid chamber 40 and particularly solenoid chamber orifice 38 is to minimize the air flow from fill passage 34 into actuator 24 while actuator 24 hangs open.

In one preferred embodiment, the problem of shuttle 26 being held open as a result of residual magnetism is solved by use of solenoid chamber orifice 38 and solenoid chamber 40. In another preferred embodiment, the residual magnetism problem may be solved by placing a non-magnetic spacer (not shown) between the plunger (not shown) and the body of actuator 24. In still another preferred embodiment, the residual magnetism problem may be solved by use of a shipboard polarity reverser (not shown) to selectively reverse the polarity of actuator 24. In such alternate embodiments, seismic source apparatus 10 need not include a solenoid chamber orifice 38 and solenoid chamber 40.

Almost instantaneously after shuttle 26 begins to translate toward actuator 24, air from main chamber 14 begins to flow through boost passage 64 and into firing chamber 52. In addition, air pressure from main chamber 14 acts against shuttle face 28 and that portion of shuttle 26 that is circumscribed by chamber sleeve lip 30. Thus, the combination of the air pressure acting on the firing chamber 52 from firing chamber passage 50 and boost passage 64, and the air pressure acting on shuttle face 28, combine to rapidly accelerate shuttle 26 toward actuator 24.

Air escaping from main chamber 14 also acts against sealing ring 82 to translate it away from shuttle face 28, thereby decompressing O-ring 78 and thereby remove the seal between shuttle face 28 and the ambient water pressure. Sealing ring 76 is translated to stop 88 and held there by the pressure of the air escaping from main chamber 14.

As shuttle 26 moves away from face seal 29, air from main chamber 14 flows outward through the 360° opening between chamber sleeve lip 30 and shuttle face 28. At the point when shuttle 26 clears chamber sleeve lip 30, shuttle 26 is undergoing rapid acceleration toward actuator 24. As shuttle 26 clears chamber sleeve lip 30, the high pressure air from main chamber 14 flows into the surrounding water, forming a nearly spherical bubble that generates the desired acoustic pressure wave.

Almost instantaneously after shuttle 26 begins to translate toward actuator 24, compressed air from main chamber 14 begins to flow through shut-off passage 66 and into shut-off chamber 68. The air pressure in shut-off chamber 68 provides a force acting on shuttle 26 in the direction of chamber sleeve 18. As the air pressure from main chamber 14 declines during the firing sequence, the combined forces exerted on shuttle 26 by spring chamber 44 and shut-off chamber 68 exceed the forces applied on shuttle 26 via the air pressure acting on firing chamber 52 and shuttle face 28. As a result, shuttle 26 is translated toward, and seated against, chamber sleeve 18 before all of the air mass in main chamber 14 is exhausted.

At the conclusion of the firing sequence, the shuttle 26 will typically not remain seated against chamber sleeve 18, but rather, will have a tendency to bounce open one or two times until the pressure in main chamber 14 has fallen sufficiently such that the combined pressures in spring chamber 44 and shutoff chamber 68 are sufficient to keep shuttle 26 seated against chamber sleeve 18. However, each time shuttle 26 bounces open after the firing sequence, air mass from main chamber 14 is uselessly lost to the surrounding water. This is due to the fact that spring chamber 44 loses the majority of its pressurized air mass on the initial return stroke of shuttle 26. Therefore, it is important to provide a secondary source of force to urge shuttle 26 to abruptly close during subsequent return strokes. Shut-off chamber 68 and shut-off passage 66 act as such a secondary source of force to act in union with spring chamber 44.

Figure 4:
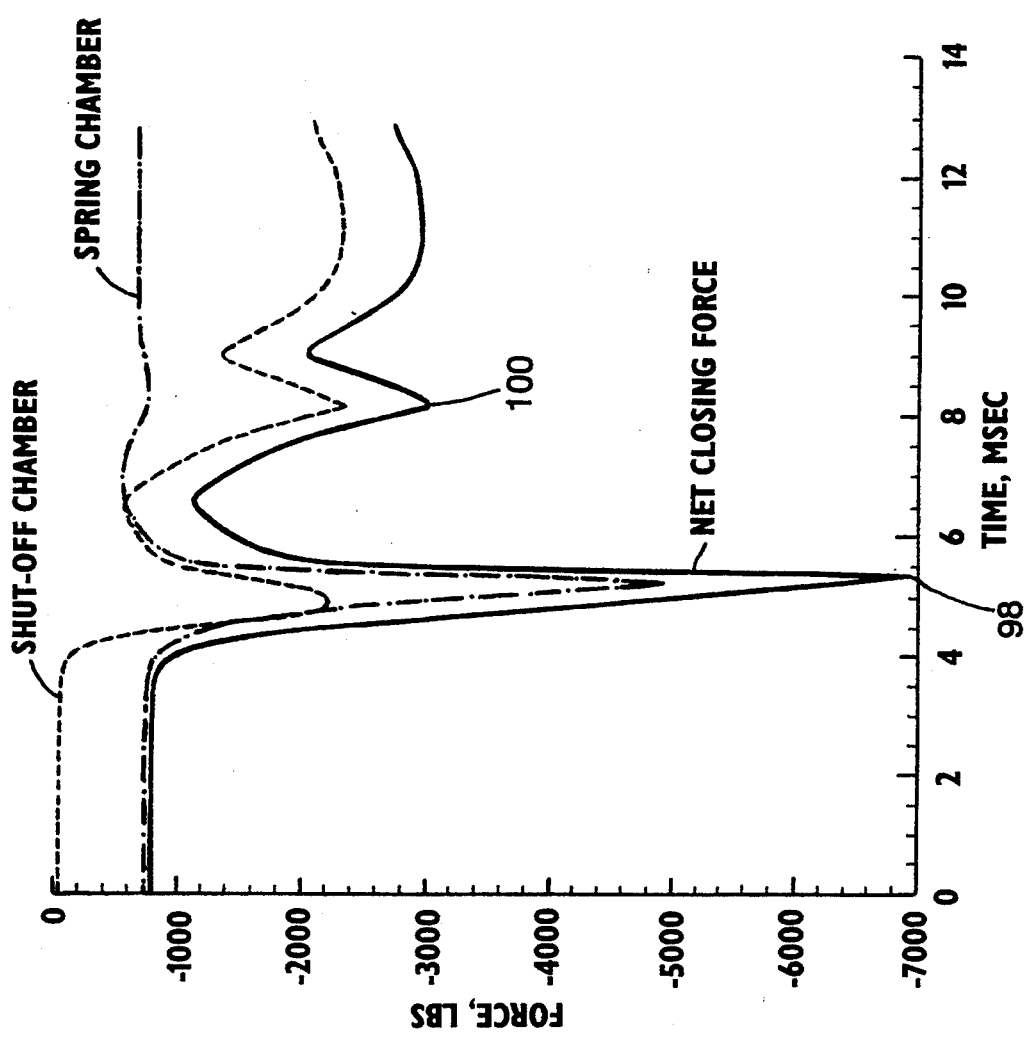
FIG. 4 depicts a plot of the forces, as a function of time, exerted on shuttle by the spring chamber and the shutoff chamber of the exemplary apparatus of FIG. 1.

Referring now to FIG. 4 which shows a plot of the forces exerted on shuttle 26 by spring chamber 44 and shutoff chamber 68 for a preferred embodiment of seismic source apparatus 10, it is evident that during the initial return stroke of shuttle 26, represented by the 5.4 millisecond point 98 on the time axis, the dominant closing force is provided by spring chamber 44, however, after the shuttle bounces open and begins its second return stroke, represented by the 8.5 millisecond point 100 on the time axis, the dominant closing force is provided by the shutoff chamber 68.

As noted above, the entire firing sequence typically lasts approximately fourteen (14) milliseconds. The air flowing past chamber sleeve lip 30 approaches sonic speeds.

After shuttle 26 has closed, the air supply to shut-off chamber 68 is cut off. Any air volume remaining within shut-off chamber 68 will bleed off into the surrounding water by passing the clearances between shuttle face 26, O-ring 78, and chamber sleeve lip 30. When the remaining air volume within the shut-off chamber 68 has bled off, peripheral springs 82 bias sealing ring 76 toward shuttle face 28 to again compress O-ring 78 and provide a seal from ambient water pressure. The seismic source apparatus 10 is then ready for the next firing.

By careful selection of the ratios of various dimensions of the seismic source apparatus 10, shuttle 26 may be closed during the firing sequence just after the maximum acoustic pressure is generated, thus: (1) saving a minimum of approximately 50% of the air mass in main chamber 14; and (2) producing a relatively small diameter bubble with the desired acoustic pressure.

For example, computer modelling has shown that the following are preferred ratios of various dimensions for a preferred embodiment of seismic source apparatus 10:

$$\frac{\text{Area of Shut-off Chamber Bearing Surface (69)}}{\text{Area of Shuttle Face (28)}} = 1.24$$

$$\frac{\text{Area of Firing Chamber Surface (56)}}{\text{Area of Shuttle Face (28)}} = 0.32$$

$$\frac{\text{Area of Spring Chamber Bearing Surface (46)}}{\text{Area of Shuttle Face (28)}} = 0.19$$

$$\frac{\text{Volume of Shut-off Chamber (68)}}{\text{Volume of Spring Chamber (44)}} = 6.53$$

A variety of materials and fabrication techniques are preferred for seismic source apparatus 10. Shuttle 26 and cap 22 are preferably Nitronic 60 stainless steel. Body 12 is preferably 17-4 PH stainless steel with H1150 heat treatment. The threads on threaded portion 20 of body 12 are preferably shot peened, passivated in a nitric acid bath, and then coated with molybdenum disulfide.

Many modifications and variations may be made in the techniques and structures described and illustrated herein without departing from the spirit and scope of the present invention. Accordingly, the techniques and structures described and illustrated herein should be understood to be illustrative only and not limiting upon the scope of the present invention.

What is claimed:

1. A seismic source apparatus having a selectively energizable actuator and a supply of compressed air, comprising:
   a. a housing adapted to receive a charge of compressed air from said supply of compressed air;
   b. a shuttle movably retained relative to said housing, and movable between a first, pre-firing position, and a second, firing position, said shuttle and said housing cooperatively defining a firing aperture when said shuttle is moved away from said first position;
   c. a shut-off chamber formed between surfaces associated with said housing and said shuttle, said shut-off chamber being operable to receive a charge of compressed air from said housing to urge said shuttle to return to its first position after movement to said second position;
   d. a shut-off passage providing fluid communication between said shut-off chamber and said firing aperture when said shuttle is moved away from said first position; and
   e. a water sealing mechanism movably retained relative to said housing and adapted to prevent ambient liquid from flowing into shut-off passage when said shuttle is in said first position.

2. The apparatus of claim 1 which further includes a closing system for urging said shuttle toward said first position when said shuttle is moved away from said first position.

3. The apparatus of claim 2 wherein said means for urging said shuttle into its first position comprises a spring chamber formed between the surfaces of said housing and said shuttle, said spring chamber being in fluid communication with said housing to receive compressed air to urge said shuttle toward said first position.

4. The apparatus of claim 2 wherein said means for urging said shuttle into a pre-firing position comprises a mechanical spring positioned to bear against said housing and said shuttle to urge said shuttle into a pre-firing position prior to and when said seismic source apparatus is fired.

5. The apparatus of claim 2 wherein said water sealing mechanism comprises a sealing ring slidably disposed about said housing and adapted to seat against said shuttle when said shuttle is in said first position, a plurality of biasing members to bias said sealing ring toward said shuttle, and an O-ring disposed between said shuttle and said sealing ring.

6. A seismic source apparatus having a selectively energizable actuator and a supply of compressed air, comprising:
   a. a housing assembly adapted to receive a charge of compressed air from said supply of compressed air, said housing at least partially defining a main chamber;
   b. a shuttle having a pre-firing position, said shuttle being slidably mounted around the periphery of said housing and operable to selectively allow the escape of compressed air from said housing when said seismic source apparatus is fired;
   c. a shut-off chamber formed between the surfaces of said housing and said shuttle, said shut-off chamber operable to receive a charge of compressed air from said main chamber to urge said shuttle to return to said pre-firing position when said seismic source apparatus is fired;
   d. a shut-off passage coupling said shut-off chamber with said housing to enable said charge of compressed air to flow into said shut-off chamber when said seismic source apparatus is fired;
   e. a solenoid chamber coupled to said housing, said solenoid chamber being adapted to receive compressed air from said supply of compressed air, and selectively operable to supply said compressed air into said actuator when said seismic source apparatus is fired to urge said shuttle to leave its pre-firing position; and
   f. a water sealing mechanism movably retained relative to said housing and adapted to prevent ambient liquid from flowing into shut-off passage when said shuttle is in said pre-firing position.

7. The apparatus of claim 6 further comprising means for urging said shuttle into said pre-firing position prior to and after said seismic source apparatus is fired.

8. The apparatus of claim 6 wherein said means for urging said shuttle into its pre-firing position comprises a spring chamber formed between the surfaces of said housing and said shuttle, said spring chamber being in fluid communication with said fill passage to receive compressed air to urge said shuttle into a pre-firing position prior to and after said seismic source apparatus is fired.

9. The apparatus of claim 6 wherein said means for urging said shuttle into a pre-firing position comprises a spring positioned to bear against said housing and said shuttle to urge said shuttle into a pre-firing position prior to and after said seismic source apparatus is fired.

10. The apparatus of claim 6 wherein said housing further includes a solenoid chamber orifice, said solenoid chamber orifice being adapted to restrict the flow of said charge of compressed air into said solenoid chamber when said seismic source apparatus is fired.

11. The apparatus of claim 6 wherein said water sealing mechanism comprises a sealing ring slidably disposed about said housing and adapted to seat against said shuttle when said shuttle is in said pre-firing position, a plurality of biasing members to bias said sealing ring toward said shuttle, and an O-ring disposed between said shuttle and said sealing ring.

12. A seismic source apparatus having a selectively energizable actuator and a supply of compressed air, comprising:
   a. a housing;
   b. a shuttle slidably mounted around the periphery of said housing and operable to selectively discharge compressed air from said housing through an aperture when said seismic source apparatus is fired;
   c. a closing piston surface for urging said shuttle into a pre-firing position prior to and after said seismic source apparatus is fired;
   d. a main chamber for storing compressed air, formed within said housing and opening 360° around said periphery thereof, said main chamber being positioned beneath said shuttle in its pre-firing position;
   e. a fill passage interconnecting said compressed air supply with said actuator and said main chamber for supplying compressed air to said main chamber, said fill passage including a solenoid chamber adapted to receive a volume of compressed air and to release said volume of compressed air into said actuator and said firing passage when said seismic source apparatus is fired, and including a solenoid chamber orifice adapted to throttle the air flowing from said main chamber into said actuator and said firing passage when said seismic source apparatus is fired;
   f. a firing passage connected to said actuator for interconnecting to said fill passage when said actuator is energized to fire said seismic source apparatus;
   g. a firing chamber formed between the surfaces of said housing and said shuttle, said firing chamber in fluid communication with said firing passage for receiving compressed air when said seismic source apparatus is fired;
   h. means for abruptly urging said shuttle to return to its pre-firing position when said seismic source apparatus is fired; and
   i. a water sealing mechanism movably retained relative to said housing and adapted to prevent ambient liquid from flowing into shut-off passage when said shuttle is in said pre-firing position.

13. The apparatus of claim 12 wherein said closing piston surface at least partially defines a spring chamber formed between the surfaces of said housing and said shuttle, said spring chamber being in fluid communication with said fill passage to receive compressed air to urge said shuttle into a pre-firing position prior to and when said seismic source apparatus is fired.

14. The apparatus of claim 12 wherein said closing piston surface includes a spring positioned to bear against said housing and said shuttle to urge said shuttle into a pre-firing position prior to and when said seismic source apparatus is fired.

15. The apparatus of claim 12 wherein said means for abruptly urging said shuttle to return to its pre-firing position when said seismic source apparatus is fired, comprises:
   a. a shut-off chamber formed between the surfaces of said housing and said shuttle; and
   b. an orifice enabling fluid communication between said shut-off chamber and said main chamber when said seismic source apparatus is fired.

16. The apparatus of claim 12 wherein said water sealing mechanism comprises a sealing ring slidably disposed about said housing and adapted to seat against said shuttle when said shuttle is in said pre-firing position, a plurality of biasing members to bias said sealing ring toward said shuttle and an O-ring disposed between said shuttle and said sealing ring.

* * * * *